US005401867A

United States Patent [19]

Sitzmann et al.

[11] Patent Number: 5,401,867

[45] Date of Patent: Mar. 28, 1995

[54] FRACTIONATION OF A MIXTURE OF SUBSTANCES

[75] Inventors: Werner Sitzmann; Thomas Willner, both of Hamburg, Germany

[73] Assignee: Krupp Maschinentechnik Gesellschaft Mit Beschränkter Haftung, Essen, Germany

[21] Appl. No.: 951,177

[22] Filed: Sep. 25, 1992

[30] Foreign Application Priority Data

Oct. 4, 1991 [DE] Germany ........................ 41 32 892.2

[51] Int. Cl.6 ........................ C09F 5/10

[52] U.S. Cl. ........................ 554/211

[58] Field of Search ........................ 554/211

[56] References Cited

U.S. PATENT DOCUMENTS

| | | | |
|---|---|---|---|
| 4,161,484 | 7/1979 | van den Berg | 554/211 |
| 4,205,095 | 5/1980 | Pike et al. | 426/607 |
| 4,243,603 | 1/1981 | Klein et al. | 260/410.7 |
| 4,247,471 | 1/1981 | Klein et al. | 260/410 |
| 4,265,826 | 5/1981 | Iida et al. | 554/211 |
| 4,465,703 | 8/1984 | Jasko et al. | 426/607 |
| 4,594,194 | 6/1986 | Dieffenbacher | 260/428 |
| 5,045,243 | 9/1991 | Kuwabara et al. | 554/211 |

FOREIGN PATENT DOCUMENTS

| | | |
|---|---|---|
| 0074146 | 3/1983 | European Pat. Off. . |
| 0081881 | 6/1983 | European Pat. Off. . |
| 0132506 | 2/1985 | European Pat. Off. . |
| 0189669 | 8/1986 | European Pat. Off. . |
| 0199580 | 10/1986 | European Pat. Off. . |
| 0256760 | 2/1988 | European Pat. Off. . |
| 0262113 | 3/1988 | European Pat. Off. . |
| 0399597 | 11/1990 | European Pat. Off. . |
| 2369800 | 6/1978 | France . |
| 7733007 | 6/1978 | France . |
| 7816181 | 12/1979 | France . |
| 0139177 | 5/1985 | France . |
| 1792812 | 3/1971 | Germany . |
| 2747765 | 4/1979 | Germany . |
| 2902235 | 7/1979 | Germany . |
| 2916604 | 10/1980 | Germany . |
| 3248922 | 4/1984 | Germany . |
| 3444475 | 6/1986 | Germany . |
| 4103575 | 11/1991 | Germany . |

(List continued on next page.)

OTHER PUBLICATIONS

Tirtiaux, A., "Dry Fractionation A Proven Technology", Lipid Technology, vol. 1, No. 1 (Aug., 1989) pp. 17–20.

Puri, P. S., "Winterization of Oils and Fats", Journal of (List continued on next page.)

*Primary Examiner*—José G. Dees
*Assistant Examiner*—Samuel Barts
*Attorney, Agent, or Firm*—Spencer, Frank & Schneider

[57] ABSTRACT

A method for dry fractionation of a mixture of meltable, higher molecular weight organic substances, including: melting a mixture of organic substances which is meltable and which has a higher molecular weight by heating the mixture to a temperature effective to provide a melt, the melt having an interior temperature; pre-cooling the melt with a cooling means including a coolant to one of (1) cool the melt without nucleation of crystallization and (2) cool the melt and nucleate crystallization at a nucleation temperature; and growing crystals under conditions effective to one of (1) nucleate crystallization at the nucleation temperature and ripen the crystals, and (2) ripen crystals nucleated in step (b), wherein precooling, nucleating and crystal ripening each include a thermal treatment, wherein, during precooling, temperature reduction is effected at any desired rate but under the conditions that the coolant has a temperature which is not more than 10° C. below the nucleation temperature, wherein, during nucleation, specific heat flow from the mixture into the coolant does not exceed 20 W/kg of the mixture and the temperature of the coolant is not more than 20° C. below the interior temperature of the melt, and wherein, during crystal ripening, specific heat flow from the melt into the coolant does not exceed 10 W/kg of the mixture and the temperature of the coolant is not more than 25° C. below that of the melt.

34 Claims, 1 Drawing Sheet

U.S. PATENT DOCUMENTS 658163 10/1986 Switzerland .
810278 3/1959 United Kingdom .
1120456 7/1968 United Kingdom .
1580181 11/1980 United Kingdom .
2180253 3/1987 United Kingdom .
2220672 7/1988 United Kingdom .

OTHER PUBLICATIONS the American Oil Chemists' Society, vol. 57, No. 11 (Nov., 1980) pp. 848–850.

Tirtiaux, F., "Le fractionnement industriel des corps gras par cristallisation diritée-procédé Tirtiaux", Oleagineux, vol. 31, No. 6 (Jun., 1976) pp. 279–285.

Willner, T., et al., "Herstellung von Kakaobutterersatz durch fraktionierte Speiseölkristallisation*", FETT WISSENSCHAFT TECHNOLOGIE, vol. 91, No. 14 (Dec., 1989) pp. 586–592.

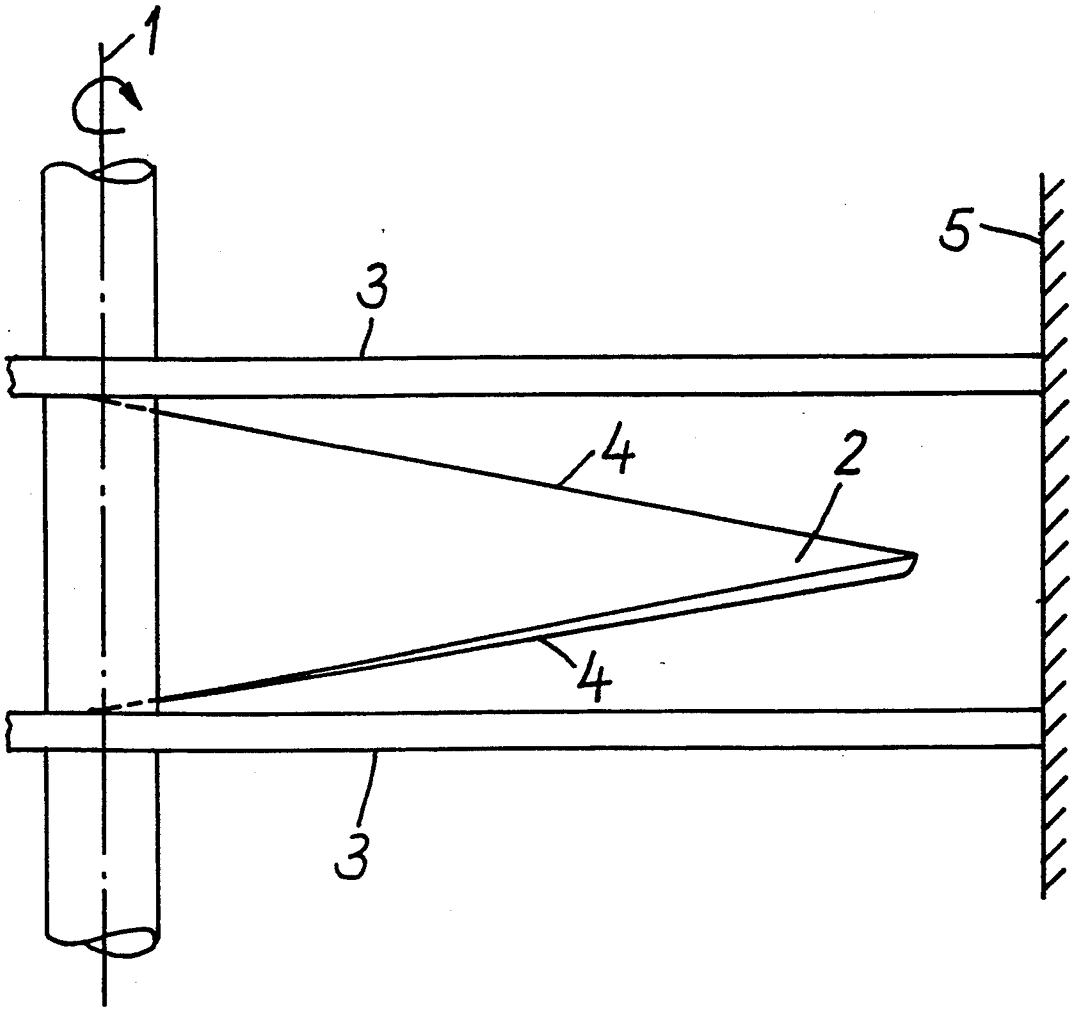
1
5
3
4
2
4
3

FRACTIONATION OF A MIXTURE OF SUBSTANCES

CROSS-REFERENCE TO RELATED APPLICATION

This Application claims the priority of application Ser. No. P 41 32 892.2 filed Oct. 4th, 1991 in Germany, the subject matter of which is incorporated herein by reference.

BACKGROUND OF THE ART 1. Field of The Invention

The present invention relates to a method of fractionating a mixture of meltable, higher molecular weight organic substances, such as, for example, fats and oils, diglycerides and triglycerides, fatty acids, and waxes and higher hydrocarbons by crystallization in the melt and subsequent separation of the crystal-containing suspension into a solid fraction and a liquid fraction, for example, a solid stearin fraction and a liquid olein fraction, and to a system for implementing the method. 2. Description of The Related Art Prior art fractionation methods can be divided into three groups (1) crystallization in solvents, (2) crystallization and phase separation with the use of detergents (fractionation by means of a wetting agent), and (3) crystallization from the melt with mechanical phase separation without auxiliary substances (dry fractionation).

Solvent fractionation is suitable for the production of all kinds of cocoa butter substitutes and generally furnishes very good quality products. Such fractionation methods are disclosed in detail, for example, in DE 3,248,922, which corresponds to U.S. Pat. No. 4,465,703; EP 0,081,881; FR 2,427,386; which corresponds to U.S. Pat. Nos. 4,243,603 and 4,247,471; DE 2,902,235; EP 0,132,506; EP 0,189,669; EP 0,199,580; and DE 2,747,765, the disclosures of which are incorporated herein by reference.

The solvent here serves primarily to reduce the viscosity in order to increase the crystallization rate by raising the diffusion coefficient, improve selectivity by reducing foreign molecule inclusion, improve dispersibility, improve conveyability, and facilitate phase separation. In addition, the selectivity is said to be improved by interaction of the solvent with the triglycerides.

The best suited solvent is acetone which, due to its polarity, interacts with the ester groups of the fat molecules. Thus, acetone has the following advantages for the fractionation of palm oil, for example, compared to hexane. Acetone provides a higher crystallization temperature (0° to −5° C. instead of −20° to −30° C.); improved selectivity in the separation of diglycerides, which are undesirable as β' stabilizers; improved selectivity in the separation of PPP; and improved selectivity in the separation of PPO. PPP and PPO are acronyms for tripalmitin and A-oleo-dipalmitin, respectively.

The basic drawbacks of solvent fractionation compared to dry fractionation are the following. Investment costs are higher due to the additional apparatus required for regeneration of the solvent and for the additional fire protection devices required. Operating costs are higher due to larger quantity streams, lower crystallization temperatures and energy consumption for recovery of the solvent. Finally, there are physiological objections to solvent residues in the product.

Wetting agent fractionation generally furnishes poorer cocoa butter replacer (CBR) qualities except for the cocoa butter substitute (CBS) produced from palm kernel oil (PKO). Additionally, the process is well suited for the first stage of palm oil fractionation, i.e., the production of palm olein.

Fractionation methods employing wetting agents as solids are disclosed in, for example, DE 1,792,812 and EP 0,074,146, the disclosures of which are incorporated herein by reference. This method furnishes good results for palm kernel stearin (PKS) production. However, if used for the production of a palm mid-fraction (PMF), the results are not satisfactory since lower crystallization temperatures result in greater viscosity and poorer phase separation conditions in centrifugal separators.

Aside from the fact that no danger of fire exists and the crystallization temperatures are changed only slightly, wetting agent fractionation, compared to dry fractionation, has the same basic drawbacks as solvent fractionation.

Prior art production of cocoa butter substitutes by dry fractionation is known from FR 2,369,800, which corresponds to U.S. Pat. No. 4,205,095, the disclosure of which is incorporated herein by reference. FR 2,369,800 discloses a process for producing a cocoa butter substitute based on palm oil having an iodine number of 50-55 that is partially miscible with cocoa butter. A two-stage conventional dry fractionation is performed in stir crystallizers (crystallizers including stirring means) to produce a palm mid-fraction.

The drawbacks of the foregoing described process include the following. (1) Crystal suspensions are produced which are subjected to a mechanical solid/liquid separation at low filtration pressures. Consequently, the thus-obtained palm mid-fraction is very soft compared to palm mid-fractions obtained with the aid of solvent fractionation due to the remaining high olein percentage. (2) The use of stir crystallizers results in the crystallization being permitted to proceed only to a certain degree due to the increasing viscosity of the crystal suspension. As a consequence, the POP concentration (1,3-dipalmitoyl-2-oleoyl-glycerin) required to obtain a high quality palm mid-fraction that is completely miscible with cocoa butter cannot be realized.

CH 0,658,163, which corresponds to U.S. Pat. No. 4,594,194, the disclosure of which is incorporated herein by reference, discloses a dry fractionation method in which palm oil is used in a two-stage fractionation to yield a palm mid-fraction having an iodine number of 36-38.

The drawbacks of this method include the following. (1) It is necessary to have seed crystals in both fractionation stages and these are expensive to produce and must be present in precisely the respectively required crystal modification (β modification in the first stage and β' modification in the second stage). (2) Due to the particularly high demands for the required crystal modification, extremely long crystallization times of three to five days are required in the second stage.

To circumvent the above-mentioned viscosity problems when performing the crystallization to produce high quality cocoa butter substitutes in stir crystallizers, EP 0,256,760, the disclosure of which is incorporated herein by reference, proposes to perform the crystallization itself in a filter press.

The drawbacks of this manner of proceeding include the following. (1) To prevent the low viscosity starting material from escaping, before crystallization, through the olein discharge paths (filter) provided in the press, the filter surfaces must be sealed with a high melting point layer of fat before each filling process. Aside from the fact that this sealing procedure is complicated, time consuming and therefore appears to be impractical, such sealing retards the discharge of the stream of olein during the press filtration. (2) The described required total periods of dwell of the material within the press far exceed the customarily employed pressing duration of approximately one hour. This increases the space requirement within the press for a given throughput. Consequently, particularly high investment costs are to be expected in view of the high compressive pressures of about 30 bar that are needed.

Also, in order to circumvent the above-described problems at high degrees of crystallization, GB 2,220,672, the disclosure of which is incorporated herein by reference, discloses a dry fractionation process for low lauric and non-lauric fats. This process is composed of the steps of (1) static crystallization in flat containers without a stirring device; (2) comminution of the hardened crystal cake in such a way that it is converted into a pumpable consistency; and (3) press filtration in order to separate the crystal cake into a crystalline stearin fraction and a liquid olein fraction at pressures of up to 28 bar.

The process disclosed in GB 2,220,672 for producing and processing crystal suspensions with high crystal concentrations which are subjected to a solid/liquid separation under increased pressures, had already been described by Wong Soon in "A Development Approach to Cocoa Butter and Cocoa Butter Replacers" Kuala Lumpur, 1987, for the processing of lauric fats.

However, GB 2,220,672 mentions explicitly that the disclosed method is not suitable for the processing of lauric fats since lauric fats form crystal suspensions which, after process step (2), cannot be converted into a pumpable consistency by comminution.

Further drawbacks of the GB 2,220,672 process include the following. Experience has shown that static crystallization is identifiably characterized by an undesirable inhomogeneity of the crystals formed due to the fact that the developing higher density crystals sink down and are compacted at the bottom of the vessel. This reduces the crystal surface available for the attachment of further molecules from the melt. Consequently, substance transport is impaired which leads at least to longer crystallization times and, in the most unfavorable cases, even to undesired incorporation in the crystals of triglyceride compositions due to kinetic effects.

This shall be explained with the following example. In the manufacture of particularly high quality palm mid-fractions that are completely miscible with cocoa butter, it is important to crystallize the highest possible percentages of POP (1,3-dipalmitoyl-2-oleoyl-glycerin) to obtain a melting behavior similar to cocoa butter. The POO molecules (1-palmitoyl-2,3-dioleoyl-glycerin) also contained in palm oil fractions are undesirable in the crystal since they lead to softening of the material. Compared to the crystallization of POP molecules, the crystallization of POO molecules is kinetically inhibited, that is, POO molecules have a slower attachment rate to existing crystals than POP because of steric impediments caused by a larger number of double bonds in the molecule.

According to the above, the very long crystallization times mentioned in GB 2,220,672 (25 to 30 hours) lead to undesirably high POO percentages relative to POP.

In GB 2,220,672, air at a constant temperature of 10° to 15° C. is preferably employed as the coolant for the crystallization of palm olein. Thus, in the so-called linear cooling period between 35° and 20° C. mentioned there, cooling rates of 6° to 120° C. per hour result. These comparatively high cooling rates occur during the sensitive nucleation phase and, as experience has shown, lead to crystals that include a larger percentage of undesirable $\beta'$ or $\alpha$ modifications.

In addition, the high temperature differences occurring at the beginning of the crystallization phase cause the material to be relatively heavily under-cooled so that the oil temperature changes drastically at the beginning of the crystal formation phase. This again results in renewed excessive temperature differences during the onset of crystallization, again leading to crystals of undesirable modification.

Moreover, experience has shown that excessive temperature differences at the beginning of a static crystallization process lead to crust formations at the phase interfaces which impede heat transfer. This again results in longer crystallization times so that the already described drawbacks are augmented.

Another drawback that should be given particular emphasis is that the procedure according to GB 2,220,672 results in crystals which are able to only withstand compressive pressures of up to a maximum of 28 bar. As experience has shown, such compressive pressures are in no way sufficient for the production of particularly high quality cocoa butter substitutes that have steep melting curves similar to cocoa butter. It is here important, in principle, to enrich a certain triglyceride class having a similar melting point (about 32° C. to 35° C.) to such an extent, e.g., POP in the palm mid-fraction or LLL (trilaurin) for palm kernel oil. The mechanical solid/liquid separation is thus the better the more liquid is pressed out of the spaces between the crystals.

Thus, it is an object of the present invention to avoid the drawbacks occurring in the processes described above and to produce fractions from mixtures of economical raw materials, such as, for example, fat fractions from palm oil, palm kernel oil and others, which, due to their physical and chemical characteristics, are able to replace relatively expensive substances, for example, cocoa butter.

It is another object of the present invention to avoid dilution by auxiliary substances of the mixture to be fractionated, such as dilution by solvents or wetting agents.

It is yet another object of the present invention to make it possible to realize a favorable fractionation of the most varied mixtures of meltable, higher molecular weight organic substances, particularly if during crystallization the resulting solids content is so high that the suspension solidifies.

SUMMARY OF THE INVENTION

The present invention resides in the fact that crystals are produced, outside of a filtration unit, whose modification is of a high thermodynamic order and which are as large as possible with the most uniform diameter. Moreover, after transfer into a filtration unit, the crystals according to the present invention are still able to withstand compressive pressures of at least 30 bar while the filter cake that is compressed during the filtration is simultaneously optimally de-oilable.

The present invention accomplishes these and other objects by providing a method for dry fractionation of a mixture of meltable, higher molecular weight organic substances which includes the steps of melting a mixture of organic substances which is meltable and which has a higher molecular weight by heating the mixture in a vessel equipped with stirring means to provide a melt; pre-cooling the melt with a cooling means to one of (1) cool the melt without nucleation of crystallization and (2) cool the melt and nucleate crystallization; and growing crystals under conditions effective to one of (1) nucleate crystallization and ripen the crystals and (2) ripen crystals nucleated in step (b), wherein pre-cooling, nucleating and crystal ripening each include a thermal treatment which is one of (1) thermal only and effected under defined heat transfer conditions and (2) thermal and mechanical and effected under defined heat transfer conditions and defined shear conditions.

BRIEF DESCRIPTION OF THE DRAWING

The sole drawing FIGURE is a front elevational view in cross-section of a portion of a cylindrical crystallizer vessel equipped with stirrers and helical cooling coils which is useful in the practice of the present invention.

DESCRIPTION OF THE PREFERRED EMBODIMENTS

The inventive process can preferably be realized in a process sequence that is broken down into the steps of (1) complete melting of the raw material; (2) agitated pre-cooling (if required, including nucleation under defined heat transfer conditions and, if required, in combination with defined shear conditions); (3) static crystal growth, if required, including nucleation under defined heat transfer conditions and, if required, in combination with defined shear conditions; (4) gentle transfer into a filtration unit; and (5) compressive filtration.

Step (1) serves to eliminate the thermal past of any undesired crystals which might exist in the mixture.

Step (2) accomplishes either pre-cooling of the material, in which case the actual nucleation of crystal formation takes place in step (3), or pre-cooling as well as nucleation of crystal formation.

If step (2) is used only for pre-cooling, it is advisably implemented in a vessel including a stirrer or in a heat exchanger. It is important, moreover, that the temperatures of the cooling surfaces do not lie substantially below the nucleation temperature since otherwise crystals of an undesirable modification could form at the cooling surfaces. Aside from this marginal condition, step (2) can, in this case, be performed at any desired speed by employing heat transfer improving measures The crystal modifications called $\alpha$, $\beta'$ and $\beta$ mean three polymorphic form, of fat crystals, which are charcterized by a particular carbon chain packing and a specific thermal stability. They can be identified by X-ray diffraction. Melting points and order of crystals are increasing in the direction $\alpha \rightarrow \beta' \rightarrow \beta$.

if step (2) involves pre-cooling as well as nucleation, this must be effected in such a way that defined heat transfer conditions are set so as to obtain the controlled formation of seed crystals of a high order. A temperature difference between the interior of the mixture to be processed and the coolant is preferably limited to a maximum of 5° C., under the additional condition that specific heat flow from the substance mixture into the coolant is preferably limited to a maximum of 5 W/kg of the mixture.

In addition to the defined heat transfer, defined shear conditions may be set to obtain the following improvements. (1) Temperature gradients in the material may be reduced so that a more uniform nucleation within the material results. (2) Heat transfer between the coolant and the mixture is improved while the temperature difference remains the same since the thickness of the boundary layer on the cooling walls is reduced. (3) If shear forces are introduced into the material, selectivity with respect to the formation of desirable $\beta$ nuclei is increased. (4) Surprisingly, the introduction of defined shear forces during nucleation in step (2) leads to a more homogeneous crystallization in the subsequent step (3) if care is taken that the shear velocities impressed on the mixture by the agitation means (stirring paddles, etc.) provided in the vessel are of approximately the same magnitude over the entire vessel area. The term homogeneous crystallization is here understood to mean, in particular, the formation of crystals of a uniform size.

Preferably, shear velocities do not exceed a predetermined product-dependent upper limit since otherwise the subsequent crystal growing step—step (3)—would lead to the undesirable formation of a larger number of smaller crystals. The reason for this is probably mechanical destruction by shearing of nuclei that were formed. However, due to the foregoing maximum permissible upper shear velocity limit, the specific amount of shear energy introduced according to the inventive method into the mixture is so low that crystal nucleation is not impeded mechanically or thermally.

The above-described combination of defined heat transfer conditions and shear forces can be realized in a simple manner, for example, in a cylindrical crystallizer vessel equipped with stirrers. A portion of such a vessel is shown in the sole drawing FIGURE which is a front elevational view in cross-section. The vessel is, moreover, characterized by the following structural features: (a) generally horizontally oriented cooling coils, for example, helical cooling coils 3; (b) a plurality of such cooling coils 3 installed one on top of the other, with the space between the cooling coils or spirals 3 being constant and adapted to the respectively required heat transfer paths; and (c) stirrer paddles 2 that rotate about vessel axis 1 and are disposed between cooling spirals 3 which extend in respective planes. The stirrer paddles 2 are configured in such a way that the space between edge 4 of one of the paddles 2 and the next plane of a cooling spiral 3 increases in proportion with the radius toward casing 5 of the vessel. Thus, the shear velocities applied to the mixture remain constant and are given by the quotient of the circumferential velocity of each paddle 2 under consideration and the distance of the respective paddle edge 4 from the plane of an adjacent cooling spiral 3.

Although the joint implementation of pre-cooling and nucleation in step (2) increases the duration of this process step, on the one hand, it shortens the duration of step (3), on the other hand. Accordingly, the duration of step (3) is lengthened if step (2) includes only pre-cooling. The optimum manner of proceeding is here a function of the product desired; both variations are available in the process according to the invention.

In step (3), the crystals ripen, either subsequent to nucleation, if nucleation was performed in step (2), or together with nucleation, if step (2) included only pre-cooling.

As experience has shown, crystallizations of a mixture where the stearin content lies above about 30% cannot be performed in stirrer crystallizers or can only be performed with difficulty due to the high viscosities encountered. However, in the production of, for example, cocoa butter substitutes by dry fractionation based on palm oil and palm kernel oil, the stearin contents are of necessity greater than 30%. For this reason, such crystallization processes are performed in such a way that the material to be crystallized is poured out in flat layers, for example in a flat, planar vessel, and is permitted to crystallize at rest, instead of being crystallized with stirring.

The drawback of such a procedure conducted under conventional temperature conditions as disclosed, for example, in GB 2,220,672, is that the progress of the crystallization within the material is very different. Usually crusts form at the contact surfaces with the coolant. These crusts, on the one hand, impede the dissipation of the latent heat of crystallization from the medium and, on the other hand, constitute a poorly filtrable mixture that has crystallized too far. Moreover, conventional temperature conditions, particularly in the crystallization of mixtures based on palm oil (or comparable fats) lead to relatively extended undercooling and, consequently, as soon as the crystallization begins, to a difficult-to-control sudden upward change of the temperature.

The crystals resulting from such temperature conditions are of moderate pressure stability, generally have a reduced percentage of $\beta$ crystals and are not suitable for high pressure filtration under compressive pressures on the order of 50 bar.

The described drawbacks of the conventional static crystallization are avoided by a further embodiment of the invention. In this inventive embodiment, static crystallization is performed paying particular attention to the importance of programmed control temperature differences between the coolant and the mixture, adapted to the respective state of the crystallization.

Essentially, two states can be distinguished: (1) nucleation and beginning crystal formation, and (2) ripening, that is, growth of already formed nuclei and crystals. In state (1), a temperature difference between the interior of the mixture and the coolant is preferably limited to a maximum of 2° C., under the additional condition that specific heat flow from the mixture into the coolant is limited to a maximum of 0.5 W per kg of the mixture. In state (2), a temperature difference between the interior of the mixture and the coolant is increased, but remains preferably limited to a maximum of 5° C., under the additional condition that specific heat flow from the mixture into the coolant is preferably limited to a maximum of 2 W per kg of mixture.

Further, during the proposed static crystallization, heat dissipation can be realized in two ways. Variation I: In the case where the resulting crystals sink to the bottom of the vessel as a result of differences in density, the released heat is primarily discharged toward the top of the vessel and, simultaneously, the bottom of the vessel is thus insulated. Variation II: In the case where the resulting crystals remain suspended, the released heat is discharged through the bottom, as well as toward the top of the vessel.

In variation II, in which twice the heat exchange surface area is available compared to variation I, it is thus possible to work with smaller temperature differences between the substance mixture and the coolant.

The introduction of defined shear forces into the mixture, in combination with the above-described variations I and II, has an advantageous influence on the crystal formation.

In contrast to step (2), that is, agitated pre-cooling (pre-crystallization), for example, in a stirred vessel, it is surprising that, during the static crystallization of step (3), it is not the introduction of certain, approximately constant shear velocities that is of advantage but the introduction of approximately constant transverse shear stresses. The shear stress in such a case is the mathematical product of dynamic strength and shear velocity. According to the invention, these shear stresses are to be dimensioned in such a way that with progressive crystallization, and thus with increasing viscosity of the medium, the specific energy input remains so low that there will be no mechanical or thermal interference with crystal formation. In particular, the shear forces introduced should be dimensioned in such a way that the shear velocities go toward zero with increasing viscosity in the final phase of the crystallization process. Such conditions can be realized, for example, by means of a rake that moves through the mixture under a low driving force.

In step (4) the crystal suspension that ripened in step (3) is gently transferred into a filtration unit. Surprisingly, the procedure according to the invention in steps (2) and (3) leads to the result that, in spite of high stearin contents of 30% or more, the material remains consistent so that, in the case of non-lauric or very slightly lauric, as well as in the case of lauric and hardened fats, the mixture can be transported through conduits without problems and without special mechanical pre-treatment. This broad application of the process according to the invention and the easy manipulatability of the ripened material is a decided advantage compared to the process disclosed in GB 2,220,672 which requires the physical breaking up of the crystallized material and cannot be used with lauric fats.

As long as the permissible maximum shear stress is not exceeded, all conceivable conveying assemblies can be employed, in principle, to transport the broken-up mixture into a filtering unit. If the materials are particularly sensitive to shear stresses, it has been found that the most gentle conveyance possible is by means of a discontinuously operating conveying assembly since the maximum shear velocities in such an assembly can be kept significantly lower due to the comparatively slow conveying movements than, for example, in continuously operating pump assemblies.

In step (5), the mixture that has been introduced into the filtration unit is mechanically separated into a liquid phase (olein) and a solid phase (stearin). The implementation according to the invention of step (5) requires compressive filtration, for example, in a membrane filter press at compressive pressures which, for example, in the case of the manufacture of palm mid-fractions or palm kernel stearin, preferably lie between 45 and 70 bar.

Surprisingly, it has been discovered that the procedure according to the present invention can be employed not only for the fractionation of fats and oils but also for the fractionation of numerous other mixtures of meltable, higher molecular weight organic substances, such as, for example, monoglycerides, diglycerides and triglycerides, fatty acids and waxes as well as higher hydrocarbons. Two representative examples of the broad field of application include (1) the removal of oil from mixtures developed during the processing of paraffin and crude paraffin, and (2) the separation of glycerin from mixtures resulting from the enzymatic production of monoglycerides.

In addition, it has surprisingly been discovered that crystal ripening can be positively influenced up to a certain degree by seeding, if seed crystals of the desired crystal configuration are added in a low concentration during the nucleation phase. Generally the improvement effect of seeding, however, is comparatively slight since the crystals produced according to the invention already are of a very good quality even without seeding.

The terms employed herein are to be understood as follows:

The term "crystallization temperature" is the temperature at the onset of crystallization and is here understood to mean the temperature at which the first visible crystals are produced, that is, the temperature at which the molten mixture begins to become cloudy. The temperature at the onset of crystallization is here synonymous with the onset of the process step or phase of crystal ripening.

The term "crystal ripening phase" is understood to be that process phase having a temperature range which lies below the temperature of the onset of crystallization. It is synonymous with the crystal growing step or phase.

The term "nucleation temperature range" relates to the "nucleation phase" and is here understood to mean the temperature range within which the material is still optically clear, that is, no crystals are visible yet to the unaided human eye, but in which very small crystal nuclei have developed. It is generally possible to prove that the nucleation phase exists if, in comparative tests, nucleation is performed at different cooling temperatures and it is determined that the crystals that become visible later on ripen differently even if they are subjected to completely identical conditions once they become visible. Beginning with a certain minimum size, crystal nuclei can also be detected by a microscope.

The term "nucleation temperature" is understood to be the respective upper temperature limit of the nucleation phase.

The "pre-cooling phase" is here meant to be that phase having a temperature range which lies above the nucleation phase, that is, above the nucleation temperature range.

The "shear velocity" in a process vessel including agitation means is here understood to be the mathematical quotient of velocity of the respective agitation means as the numerator and distance from the closest, fixed, built-in component, such as the vessel wall or the vessel bottom, as the denominator.

The "specific heat flow", Q, from the mixture into the coolant is determined by the formula:

$$Q = \frac{C \cdot T + X \cdot H}{t}$$

and is given in W/kg of the mixture, that is, watts per kilogram of the mixture. Specific heat flow is determined in a time period, t, from (1) the change in temperature, T, (which is understood to be the difference between the average temperature of the material at the beginning and at the end of the respective time period under consideration) (2) the specific thermal capacity, C, of the material in J/(kg °C.), that is, Joule per kilogram of the mixture per degree Celsius, and change in temperature in degrees Celsius (for fats, for example, specific thermal capacity, C, is known to be about 2150 J/(kg °C.), (3) the increase in crystal content, X, during time period t, stated in kg of crystal per kg of the mixture, and (4) the released latent specific heat of crystallization, H, given in J/kg of crystals (for fat crystals, for example, H is known to have an order of magnitude of 100,000 to 200,000 J/kg).

The following examples serve to illustrate the process according to the invention but are not intended to be a limitation of the invention.

Example 1

Starting with 30 kg of a simply fractionated palm olein having an iodine number of 56.6, a stearin having an increased POP percentage and a doubly fractionated palm olein of a high iodine number were produced by the following variation of the fractionation process according to the invention.

The palm olein was heated to 70° C. in a stirring vessel to provide a melt. The material was then cooled rapidly to 30° to 35° C. to effect pre-cooling, with the stirrer rotating at more than 40 revolutions per minute. To obtain the highest possible heat transfer coefficient of preferably more than 100 $W/m^2.K$ during this pre-cooling phase, a cooling means including a liquid coolant was employed, namely, water in this example. Care was taken that the temperature of the coolant did not fall significantly below the nucleation temperature of 19° to 29° C.

The subsequent nucleation phase was initiated within the stirring vessel by reducing the number of revolutions per minute of the stirrer so that shear velocities of 10 1/s were not exceeded. In this example, this corresponds to 11 revolutions per minute. Further cooling of the oil proceeded and was controlled by regulation of the temperature difference between the coolant and the oil in such a manner that the specific heat flow was reduced from the initial oil temperature of 30° to 35° C. down to the crystallization temperature of 14° to 20° C., approximately linearly over time, from about 4.0 to about 0.2 W/kg of the oil. The coolant flowed at 5 to 15 l/min. The heat transfer conditions in the stirring vessel were such that, at the end of the nucleation phase, a temperature difference of 0.5° C. between the coolant and the oil was not exceeded.

After the onset of crystallization, the suspension still flowed easily and the suspension was filled into a stainless steel tub in which the crystals were ripened. The fill level of the material in the vessel was 45 mm. This fill level was selected so that during the entire ripening process it was ensured that the temperature difference between the respective temperature maximum in the interior material and the surface temperature of the material does not exceed 3° C.

The coolant employed during the crystal ripening phase was air which flowed around the tub on all sides. Further cooling of the oil was realized by regulating the existing temperature difference between the coolant and the oil so that, within the first five hours of crystal ripening, the specific heat flow increase was approximately linear over time from about 0.2 to about 1.0 W/kg of the oil. Then the heat flow was kept at about 1.0 W/kg of the oil until the end of the crystallization phase was reached. The cooling air stream flowed at about 200 $m^3/h$. The heat transfer conditions were such that a maximum temperature difference of 5° C. was not exceeded between the interior of the crystallizing layer of material and the cooling air. The crystal ripening phase was terminated when the remaining liquid oil was determined to have an iodine number of 69. Termination was accomplished by moving the suspension into a filtration unit immediately after the desired iodine number had been reached for the remaining liquid oil, the so-called olein phase that was still present between the crystals. To monitor the iodine number of the olein, test filtrations of suspension samples were made during the crystal ripening phase.

After the crystal suspension was moved to the filtration unit, the liquid phase was pressed out through a filter cloth. The filter chamber was subjected to a compressive pressure that slowly rose over 45 minutes and was generated by a mechanical reduction of the volume of the filter chamber. The filtration pressure employed reached 55 bar.

This example yielded 13.8 kg of stearin having an iodine number of 42 and 16.2 kg of olein having an iodine number of 69.

Example 2

Twelve kg of the stearin obtained in Example 1 was subjected to the dry fractionation process according to the invention in order to produce a palm mid-fraction that has a particularly steep melting curve.

The material was melted by heating same to 70° C. in a vessel equipped with stirring means. The material was then cooled as rapidly as possible to 35° to 40° C. during the precooling step at an increased stirrer speed of more than 40 revolutions per minute. To obtain the highest possible heat transfer coefficient in this phase preferably more than 100 $W/m^2.K$, a cooling means including a liquid coolant was employed, which was water in this example. The temperature of the coolant was not allowed to fall below the nucleation temperature of 27° to 35° C.

The subsequent nucleation phase within the stirring vessel was initiated by reducing the number of revolutions of the stirrer so that shear velocities of 10 1/s were not exceeded. In this example, this corresponded to a stirrer speed of 11 revolutions per minute. Further cooling of the oil was realized by regulating the temperature difference existing between the coolant and the oil so that the specific heat flow reduction was approximately linear over time from 3.2 to 0.2 W/kg of oil, from the initial oil temperature of 35° to 40° C., down to the crystallization temperature of about 22° to 28° C. The coolant flowed at 5 to 15 l/min. The heat transfer conditions in the stirrer were such that, at the end of the nucleation phase, a temperature difference of 0.5° C. between the coolant and the oil was not exceeded.

After the start of crystallization, the suspension continued to flow easily and was transferred into a stainless steel tub in which the crystals were ripened. In the present example, the material was filled to a fill level of 45 mm. This fill level was selected to ensure that, during the entire crystal ripening process, the temperature difference between the respective temperature maximum in the material and the surface temperature of the material would not exceed 3° C.

In this example, air was used as the coolant and was flowed around the tub on all sides. The further cooling of the oil was realized by regulating the existing temperature difference between the coolant and the oil in such a way that the increase in the specific heat flow within the first five hours of crystal ripening was approximately linear over time from about 0.2 to about 1.0 W/kg of the oil. Then the flow of heat was maintained at about 1.0 W/kg until the end of the crystallization phase. The stream of cooling air flowed at about 200 $m^3/h$. The heat transfer conditions were such that a maximum temperature difference of 5° C. was not exceeded between the interior of the layer of crystallizing material and the cooling air. The crystal ripening phase was terminated when the iodine number of the remaining oil reached a level of 50. Termination was accomplished by the transfer of the suspension into a filtration unit immediately after the desired iodine number was reached for the remaining oil, the so-called olein phase, that was still present between the crystals. To monitor the iodine number of the olein, test filtrations of suspension samples were performed during the crystal ripening phase.

After the crystal suspension was moved into the filtration unit, the liquid phase was pressed out through a filter cloth. The filter chamber was slowly charged with a compressive pressure that was generated by a mechanical reduction of the volume of the filter chamber and was increased slowly over a period of 45 minutes. The final filtration pressure reached 60 bar.

This example yielded 6.4 kg of stearin having an iodine number of 35 and 5.6 kg of olein having an iodine number of 50.

The variation in solid fat content of the stearin phase with temperature was recorded by means of a pulsed NMR (nuclear magnetic resonance) spectrometer according to DGF-C-IV 3 g 6.2.2 and the results were 92% at 10° C., 84% at 20° C., 70% at 25° C. 42% at 30° C., 4.2% at 35° C. and 0% at 40° C.

The abbreviation DGF-C-IV 3 g 6.2.2 means analysis method of the Deutche Gesellschaft für Fettwissenschaft (DGF). This method is characterized by a very long tempering procedure for the sample of 40 hours at 26° C. before the temperature is set to the respective measuring temperature.

Example 3

Starting with 11 kg of palm kernel oil having an iodine number of 18.2, a palm kernel stearin having a particularly low iodine number and a palm kernel olein having a relatively high iodine number were obtained according to the following variation of the fractionation process according to the invention.

Melting of all crystalline phases within the palm kernel oil was ensured by heating same to 60° C. in a vessel with stirring. The material was then cooled rapidly to 32° to 37° C. during the pre-cooling phase, with the speed of the stirrer increased to more than 40 revolutions per minute. In order to obtain the highest possible heat transfer coefficient in this phase, preferably more than 100 $W/m^2.K$, a liquid coolant was employed and was water in this example. The temperature of the coolant was not permitted to fall significantly below the nucleation temperature of 26° to 32° C.

The subsequent nucleation phase was conducted within the stirring vessel and was initiated by a reduction of the stirrer speed in which shear velocities of 10 1/s were not exceeded. In this example, this corresponded to a stirrer speed of 11 revolutions per minute. Further cooling of the oil was realized by regulating the temperature difference existing between the coolant and the oil so that the reduction in the specific heat flow was approximately linear over time from about 2.8 to about 0.2 W/kg of the oil, from the initial oil temperature of 32° to 37° C. to the crystallization temperature of 22° to 28° C. The coolant flowed at 5 to 15 l/min. The heat transfer conditions in the stirrer were such that, at the end of the nucleation phase, a temperature difference of 0.5° C. between the coolant and the oil was not exceeded.

After the onset of crystallization, the suspension continued to flow easily and was transferred into a stainless steel tub in which the crystals were ripened. The fill level of the material in the present example was 41 mm. This fill level was selected to ensure that, during the entire crystal ripening process, the temperature difference between the respective temperature maximum in the interior of the material and the surface temperature of the material would not exceed 3° C.

In this example, air was used as the coolant and was flowed around the tub on all sides. Further cooling of the oil was realized by regulating the existing temperature difference between the coolant and the oil in such a way that the specific heat flow within the first four hours of crystal ripening increased approximately linearly over time from about 0.2 to about 1.1 W/kg of the oil. Then the flow of heat was held at about 1.1 W/kg of the oil until the end of the crystallization phase. The cooling air flowed at about 200 $m^3/h$. The heat transfer conditions were such that a maximum temperature difference of 5° C. between the interior of the layer of crystallizing material and the cooling air was not exceeded. The crystal ripening phase was terminated when the iodine number of the remaining oil reached a level of 26. Termination was accomplished by transfer of the suspension into a filtration unit immediately after the liquid oil remaining between the crystals, the so-called olein phase, reached the desired iodine number. To monitor the iodine number of the olein, test filtrations of suspension samples were made during the crystal ripening phase.

After the crystal suspension had been moved to the filtration unit, the liquid phase was pressed out through a filter cloth. The filter chamber was charged with a slowly increasing compression pressure that was generated by a mechanical reduction of the volume of the filter chamber, and was slowly increased within a period of 60 minutes. The final filtration pressure reached 70 bar.

This example yielded 4.4 kg of palm kernel stearin having an iodine number of 6.5 and 6.6 kg of olein having an iodine number of 26.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. In a method for dry fractionation of a mixture of at least one meltable, higher molecular weight organic substance selected from the group consisting of fats, oils, monoglycerides, diglycerides, triglycerides, fatty acids, waxes, and higher hydrocarbons, the method consisting essentially of:

(a) melting a mixture of organic substances which is meltable and which has a higher molecular weight by heating the mixture to a temperature effective to provide a melt, the melt having an interior temperature;

(b) pre-cooling the melt with a cooling means including a coolant to one of (1) cool the melt without nucleation of crystallization and (2) cool the melt and nucleate crystallization at a nucleation temperature; and (c) growing crystals under conditions effective to one of (1) nucleate crystallization at the nucleation temperature and ripen the crystals, and (2) ripen crystals nucleated in step (b), the improvement comprising:

thermally treating during each of pre-cooling, nucleating and crystal ripening, wherein, during pre-cooling, temperature reduction is effected at any desired rate but under the condition that the coolant has a temperature which is not more than 10° C. below the nucleation temperature, wherein, during nucleation, specific heat flow from the mixture into the coolant does not exceed 20 W/kg of the mixture and the temperature of the coolant is not more than 20° C. below the interior temperature of the melt, and wherein, during crystal ripening, specific heat flow from the melt into the coolant does not exceed 10 W/kg of the mixture and the temperature of the coolant is not more than 25° C. below that of the melt.

2. The method as defined in claim 1, wherein the mixture comprises a palm oil fraction.

3. The method as defined in claim 1, wherein the mixture comprises a palm olein having an iodine number ranging between 55 and 58.

4. The method as defined in claim 1, wherein the mixture comprises a stearin fraction obtained according to claim 3.

5. The method as defined in claim 1, wherein the mixture is selected from the group consisting of palm kernel oil, a mixture obtained during the processing of crude or processed paraffin, and a mixture obtained during enzymatic production of monoglycerides.

6. The method as defined in claim 1, wherein the thermal treatment is effected by at least one of (a) regulating the temperature of the coolant, (b) regulating the temperature of the mixture, and (c) regulating a difference in temperature between the mixture and the coolant.

7. The method as defined in claim 1, wherein the pre-cooling takes place in at least two successive devices equipped with at least one of cooling means and agitation means, and wherein the cooling means includes a coolant which is one of (a) a liquid and (b) a gas.

8. The method as defined in claim 1, wherein one of (a) pre-cooling and nucleation take place jointly in one apparatus and crystal ripening takes place in a second apparatus, (b) pre-cooling takes place in one apparatus and nucleation together with crystal ripening take place in a second apparatus, (c) pre-cooling and a portion of nucleation take place together in one apparatus and a remaining portion of nucleation together with crystal ripening take place in a second apparatus, and (d) pre-cooling, nucleation and crystal ripening are distributed to more than two different pieces of apparatus.

9. The method according to claim 1, wherein the temperature of the coolant is not more than 3° C. below the nucleation temperature.

10. The method as defined in claim 1, wherein the specific heat flow during nucleation does not exceed 5 W/kg of the mixture and the temperature of the coolant is not more than 5° C. below the interior temperature of the melt.

11. The method as defined in claim 1, wherein the melt has a crystallization temperature at which the melt becomes cloudy, and wherein, during nucleation, the specific heat flow from the melt into the coolant is reduced as the crystallization temperature is approached from an initial maximum of 20 W/kg of the mixture to a final maximum of 3 W/kg of the mixture and correspondingly the temperature of the coolant is reduced from an initial maximum of not more than 20° C. below the interior temperature of the melt to a final maximum of not more the 3° C. below the interior temperature of the melt.

12. The method as defined in claim 11, wherein the specific heat flow during nucleation is reduced from an initial maximum of 5 W/kg of the mixture to a final maximum of 0.5 W/kg of the mixture, and the temperature of the coolant is reduced from an initial maximum of not more than 5° C. below that of the mixture to a final maximum of not more than 0.5° C. below that of the mixture.

13. The method ad defined in claim 1, wherein nucleation is effected in a vessel equipped with agitation means and the mixture is subjected to a shear velocity which does not exceed 100 per second.

14. The method as defined in claim 13, wherein the shear velocity does not exceed 10 per second.

15. The method as defined in claim 13, wherein the entire mixture is subjected to shear velocities which have an essentially uniform magnitude.

16. The method as defined in claim 1, wherein nucleation takes place in a flat, planar vessel having a fill level of the mixture and wherein the fill level does not exceed 0.2 m.

17. The method as defined in claim 16, wherein the fill level ranges between 0.025 m and 0.07 m.

18. The method as defined in claim 16, wherein the flat, planar vessel is equipped with agitation means which is moved through the mixture at a speed which does not exceed 10 m/s.

19. The method as defined in claim 18, wherein the speed does not exceed 1 m/s.

20. The method as defined in claim 1, wherein the specific heat flow during crystal ripening does not exceed 2 W/kg of the mixture and the temperature of the coolant is not more than 5° C. below that of the mixture.

21. The method as defined in claim 1, wherein, during crystal ripening, the specific heat flow from the mixture into the coolant is increased from an initial value which does not exceed 3 W/kg of the mixture, to a final value which does not exceed 10 W/kg of the mixture and correspondingly the temperature of the coolant is increased from an initial value which is not more than 8° C. below that of the mixture to a maximum value which is not more than 25° C. below that of the mixture.

22. The method as defined in claim 21, wherein the specific heat flow during crystal ripening has an initial value which does not exceed 0.5 W/kg of the mixture and a final value which does not exceed 2 W/kg of the mixture, and the temperature of the coolant has an initial value which is not more than 2° C. below that of the mixture and a maximum value which is not more than 5° C. below that of the mixture.

23. The method as defined in claim 21, wherein, during crystal ripening, the specific heat flow from the mixture into the coolant is reduced toward the end of crystal ripening to a final value which does not exceed 5 W/kg of the mixture and correspondingly the temperature of the coolant is reduced toward the end of crystal ripening to a final value which is not more than 15° C. below that of the mixture.

24. The method as defined in claim 23, wherein the specific heat flow during crystal ripening has a final value which does not exceed 1 W/kg of the mixture and the temperature of the coolant has a final value which is not more than 3° C. below that of the mixture.

25. The method as defined in claim 1, wherein crystal ripening takes place in a flat, planar vessel having a fill level of the mixture and wherein the fill level does not exceed 0.15 m.

26. The method according to claim 25, wherein the fill level ranges between 0.025 m and 0.07 m.

27. The method as defined in claim 25, wherein the flat, planar vessel has a top and bottom, and wherein heat removed from the mixture in the flat, planar vessel is transported out of the mixture to the same degree toward the top and toward the bottom of the flat, planar vessel.

28. The method as defined in claim 25, wherein the flat, planar vessel has a top and a bottom, and wherein the bottom of the flat, planar vessel is insulated and heat to be removed from the mixture is transported out of the mixture primarily at the top of the flat, planar vessel.

29. The method as defined in claim 25, wherein the flat, planar vessel comprises agitation means which is moved through the mixture at an initial speed which does not exceed 5 m/s, which is moved more slowly as the mixture's viscosity increases during crystal ripening, and which is finally stopped before crystal ripening is ended.

30. The method as defined in claim 29, wherein the initial speed does not exceed 0.5 m/s.

31. The method as defined in claim 1, wherein, after crystal ripening has ended, the mixture including the crystals is transferred by transfer means to a filtration apparatus without the crystals having been previously broken up, and wherein the transfer means includes a machine operating according to a discontinuous displacement principle.

32. The method according to claim 31, wherein the filtration apparatus is a filter press.

33. The method as defined in claim 1, wherein, after the end of crystal ripening, the mixture including the crystals is gently mechanically broken up in order to increase its fill level in subsequent processing devices prior to being transferred by transfer means to a filtration apparatus.

34. The method as defined in claim 33, wherein the transfer means includes a conveyor which is a slowly revolving pump and which is operated continuously to provide a gentle conveyance.

* * * * *